United States Patent
Mishiro et al.

(10) Patent No.: US 6,392,407 B1
(45) Date of Patent: May 21, 2002

(54) ROTATION ANGLE DETECTING DEVICE

(75) Inventors: Naohiro Mishiro; Izuru Shinjo; Masahiro Yokotani, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/994,679

(22) Filed: Nov. 28, 2001

(30) Foreign Application Priority Data

May 30, 2001 (JP) ........................................ 2001-162099

(51) Int. Cl.[7] .................................................. G01B 7/30
(52) U.S. Cl. .............................. 324/207.19; 324/207.25
(58) Field of Search ...................... 324/207.12, 207.15, 324/207.16, 207.19, 207.25, 207.21; 363/140, 132; 323/365

(56) References Cited

U.S. PATENT DOCUMENTS 5,493,219 A * 2/1996 Makino et al. ........ 324/207.25
5,982,171 A * 11/1999 Umemoto .......... 324/207.25 X
6,169,396 B1 * 1/2001 Yokotani et al. .... 323/207.12 X

FOREIGN PATENT DOCUMENTS

| JP | 06-350159 | 12/1994 | ........... H01L/43/08 |
| JP | 07-167876 | 7/1995 | ........... G01P/3/488 |
| JP | 08-193839 | 7/1996 | ........... G01D/5/18 |

* cited by examiner

Primary Examiner—Jessica Han
(74) Attorney, Agent, or Firm—Sughrue Mion, PLLC

(57) ABSTRACT

In a rotation angle detecting device, a circuit scale thereof is reduced and a manufacturing cost thereof is lowered. The rotation angle detecting device is arranged by comprising: a bridge circuit for converting a magnetic field change of an MR element into a voltage change; a 1st differential amplifying circuit for amplifying the signal outputted from the bridge circuit; an AC coupling circuit for removing a DC component from the output signal of the 1st differential amplifying circuit; a 2nd differential amplifying circuit for amplifying the signal output from the AC coupling circuit; a comparing circuit for comparing the signal outputted from the 2nd differential amplifying circuit with a reference value to thereby output any one of a signal of "0" and a signal of "1"; an output circuit for waveform-shaping the signal outputted from the comparing circuit; and an initiating circuit including a 1st to a 3rd transistors, and a differentiating circuit for driving the 1st to 3rd transistors; in which both the 1st and the 2nd transistors are connected to the AC coupling circuit so as to converge the output signal of the AC coupling circuit into a reference voltage immediately after a power supply is turned ON; and in which the 3rd transistor is connected to the comparing circuit so as to also converge the input signal of the comparing circuit into an AC coupling reference level.

2 Claims, 6 Drawing Sheets

FIG. 4
(a)
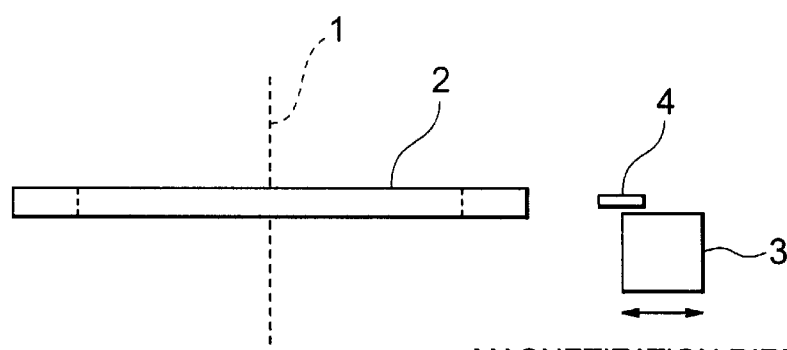
MAGNETIZATION DIRECTION
(OPPOSITE DIRECTION OF MAG-
NETIC ROTATION MEMBER)
(b)
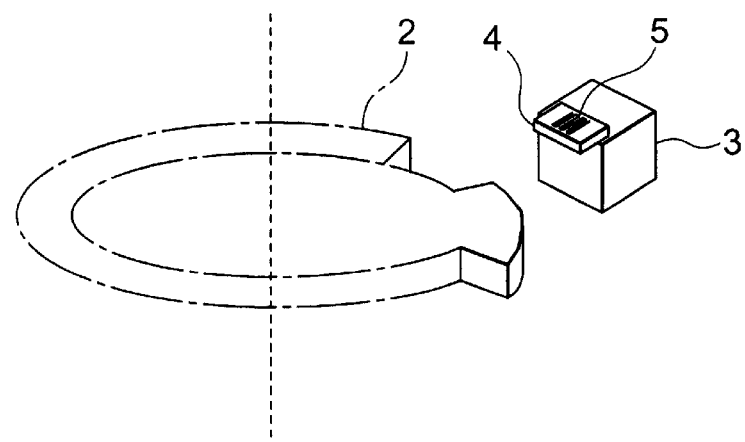
(c)
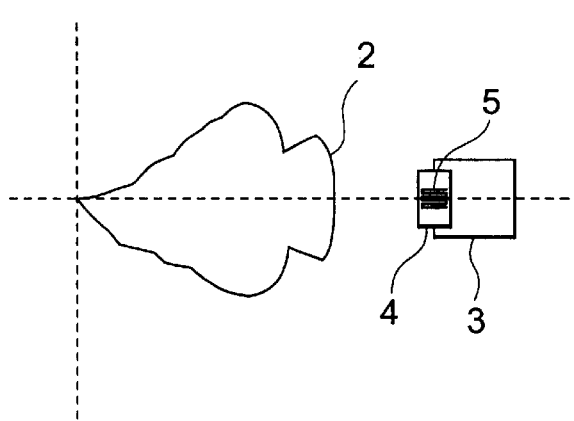

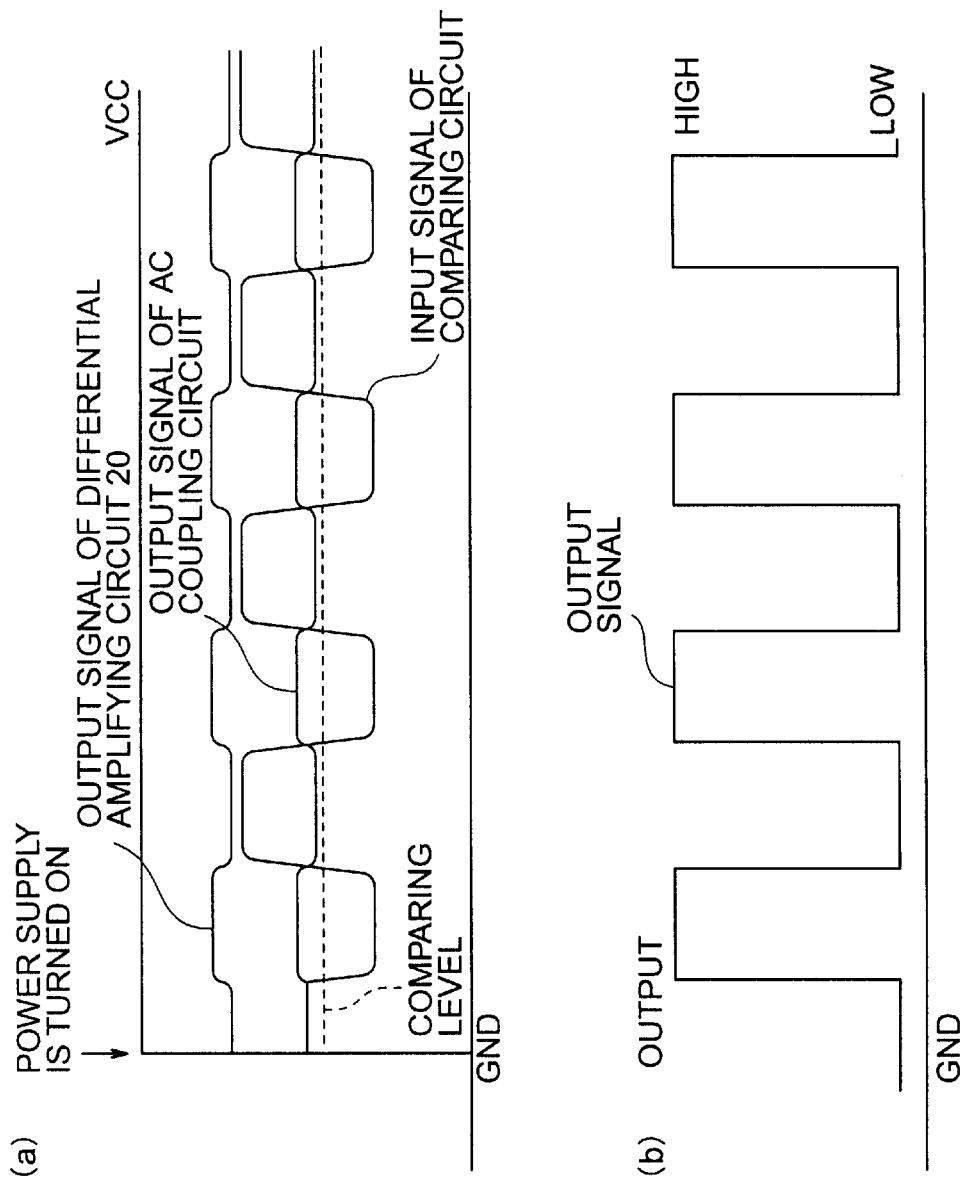

ROTATION ANGLE DETECTING DEVICE

This application is based on application Ser. No. 2001-162099, filed in Japan on May 30, 2001, the contents of which are hereby incorporated by reference.

BACKGROUND OF THE INVENTION

1. Field of the Invention

The present invention relates to a rotation angle detecting device capable of magnetically detecting, for instance, a rotation angle of a gear-shaped magnetic rotation member.

2. Description of the Related Art

Referring now to a drawing, a conventional rotation angle detecting device will be described. FIG. 4(a) to FIG. 4(c) are diagrams for illustratively showing a magnetic circuit of a conventional rotation angle detecting device. FIG. 5 represents a signal processing circuit employed in the conventional rotation angle detecting device.

In FIG. 4, reference numeral 1 shows a rotation shaft corresponding to a crank shaft of a vehicle engine, reference numeral 2 represents a magnetic rotation member, reference numeral 3 indicates a magnet, reference numeral 4 denotes a chip, and reference numeral 5 shows a magnetic detecting element (will be referred to as an "MR element" hereinafter).

In FIG. 5, reference numeral 10 shows a bridge circuit, reference numeral 20 indicates a differential amplifying circuit, reference numeral 30 represents an AC coupling circuit, reference numeral 40 indicates another differential amplifying circuit, reference numeral 50 shows a comparing circuit, reference numeral 60 indicates an output circuit, and also reference numeral 70 is an initiating circuit.

As illustrated in FIG. 4, the conventional rotation angle detecting circuit contains the magnet 3 having a rectangular solid shape, the chip 4, and the magnetic detecting element 5. This chip 4 is mounted on an upper surface of this magnet 3, and a semiconductor integrated circuit (namely, signal processing circuit) is built in this chip 4.

Since the magnetic rotation member 2 having the gear shape is rotated which is provided in the vicinity of the above-explained rotation angle detecting device, a concave portion and a convex portion of the magnetic rotation member 2 are alternatively positioned in the vicinity of the magnetic detecting element 5. As a result, a magnetic field, which is applied from the magnet 3 to the magnetic detecting element 5, is changed. This change in the magnetic fields may be detected as a change in voltages by the magnetic detecting element 5.

This change in the voltages is outputted as a pulsatory electric signal through the differential amplifying circuit 20, the AC coupling circuit 30, the differential amplifying circuit 40, the comparing circuit 50, and the output circuit 60, which are provided in the chip 4, to an external circuit. This pulsatory electric signal is supplied to a computer unit (not shown), so that a rotation angle of the magnetic rotation member 2 may be detected.

Generally speaking, as the magnetic detecting element 5, either a magnetic resistance element (will be referred to as a "MR element" hereinafter) or a giant magnetic resistance element (will be referred to as a "GMR element" hereinafter) is employed. However, since the operations of these MR element and GMR element are substantially identical to each other, operations of the rotation detecting device in the case that the MR element is employed will be explained in detail.

An MR element (magnetic resistance element) corresponds to such an element whose resistance value is changed based upon an angle defined between a magnetization direction of a thin film of a ferromagnetic material (for example, Ni—Fe, Ni—Co etc.) and a current direction thereof. The resistance value of this MR element becomes minimum when the current direction is intersected with the magnetization direction at a right angle, whereas the resistance value of the MR element becomes maximum in the case that the current direction is intersected with the magnetization direction at an angle of 0 degree. In other words, when both the current direction and the magnetization direction are intersected along the same direction, or completely opposite directions, this resistance value becomes maximum. This change in the resistance values will be referred to as an MR change rate. Generally speaking, the MR change rate of Ni—Fe is equal to 2 to 3%, and the MR change rate of Ni—Co is equal to 5 to 6%.

Since the magnetic rotation member 2 is rotated, a magnetic field applied to the MR element 5 is changed, so that the magnetic resistance value of this MR element 5 is changed. Accordingly, in order to detect the change in the magnetic fields, as indicated in FIG. 5, the bridge circuit 10 is constituted by employing the MR element 5. While this bridge circuit 10 is connected to a power supply capable of supplying a constant voltage and a constant current, the resistance value change of the MR element 5 is converted into a voltage change, and then, a change in magnetic fields which is exerted to this MR element 5 may be detected.

The conventional rotation angle detecting device is arranged by employing the bridge circuit 10, the differential amplifying circuit 20, the AC coupling circuit 30, the differential amplifying circuit 40, the comparing circuit 50, the initiating circuit 70, and the output circuit 60. The bridge circuit 10 is constructed of the MR element 5. The differential amplifying circuit 20 amplifies the output signal of this bridge circuit 10. The AC coupling circuit 30 removes a DC component from the output signal of the differential amplifying circuit 20. The differential amplifying circuit 40 amplifies the output signal of this AC coupling circuit 30. The comparing circuit 50 compares the output signal of this differential amplifying circuit 40 with a reference value to output either a signal of "0" or a signal of "1". The initiating circuit 70 sets the output signal of this comparing circuit 50 to a preselected level. The output circuit 60 is operated in a switching mode in response to the output signal of this comparing circuit 50.

The bridge circuit 10 contains a resistor 11 and the above-described MR element 5. The resistor 11 is connected to a power supply terminal VCC; the MR element 5 is connected to the ground; and the other respective terminals of the resistor 11 and the MR element 5 are connected to a junction point "A."

Then, the connection point "A" of the bridge circuit 10 is connected via a resistor 21 to an inverting input terminal of an operational amplifier 20 employed in the differential amplifying circuit 20. Also, a non-inverting input terminal of this operational amplifier 22 is connected via a resistor 27 to a voltage dividing circuit which constitutes a reference power supply, and is further connected via a resistor 24 to the ground. The output terminal of the operational amplifier 22 is connected via the resistor 23 to the own inverting input terminal, and also is connected to a capacitor 31 employed in the AC coupling circuit 30.

The AC coupling circuit 30 is arranged by one capacitor 31 and a resistor 34. A junction point between the capacitor 31 and the resistor 34 is connected via the resistor 41 to an inverting input terminal of an operational amplifier 42 employed in the differential amplifying circuit 40. Also, another terminal of the resistor 34 is connected to a voltage dividing circuit which constitutes a reference power supply.

Also, a non-inverting input terminal of the operational amplifier 42 provided in the differential amplifying circuit 40 is connected via a resistor 47 to the voltage dividing circuit which constitutes the reference power supply, and further, is connected via a resistor 44 to the ground. An output terminal of this operational amplifier 42 employed in the differential amplifying circuit 40 is connected via a resistor 43 to the own inverting input terminal, and also is connected to an inverting input terminal of an operational amplifier 51 employed in the comparing circuit 50.

Both a non-inverting input terminal and an output terminal of an operational amplifier 77 employed in the initiating circuit 70 are connected to the output terminal (namely, junction point between capacitor 31 and resistor 34) of the AC coupling circuit 30, and the non-inverting input terminal of this operational amplifier 77 is connected to a reference voltage unit (voltage dividing circuit) of the AC coupling circuit 30.

A non-inverting input terminal of an operational amplifier 51 employed in the comparing circuit 50 is connected to the voltage dividing circuit, and an output terminal of this operational amplifier 51 is connected to a base of a transistor 61 provided in the output circuit 60.

A collector of the transistor 61 provided in the output circuit 60 is connected to a transistor 62 and also a base of a transistor 56 employed in the comparing circuit 50, and also is connected via a resistor 63 to the power supply terminal VCC. An emitter of this transistor 61 is connected to the ground. A collector of a transistor 62 is connected to an output terminal 65, and also connected via a resistor 64 to the power supply VCC, and further, an emitter of this transistor 62 is connected to the ground.

In addition, a collector of a transistor 56 employed in the comparing circuit 50 is connected to a voltage dividing circuit which constitutes a reference power supply of the comparing circuit 50, and an emitter of this transistor 56 is connected to the ground.

FIG. 6 is a timing chart for indicating a waveform processing operation obtained while the magnetic rotation member is rotated in the above-explained conventional rotation angle detecting device.

Since the magnetic rotation member 2 is rotated, a magnetic field change is applied to the MR element 5, so that such an output as shown in FIG. 6(a) is obtained from the output side of the differential amplifying circuit 20. This output signal corresponds to the concave/convex portions of the magnetic rotation member 2.

The output signal of this differential amplifying circuit 20 is supplied to the AC coupling circuit 30, and then, a DC component is removed from this supplied signal by this AC coupling circuit 30. At the same time, a reference voltage (for example, (½)×VCC) is applied as a DC component. Then, the output signal of this AC coupling circuit 30 is furthermore amplified by the differential amplifying circuit 40, and then, the amplified signal is supplied to the comparing circuit 50.

As indicated in FIG. 6(a), the signal (input signal of comparing circuit) which is supplied to the comparing circuit 50 is compared with a reference value equal to a comparison level so as to be converted into either a signal of "0" or a signal "1."

This comparison signal is furthermore waveform-shaped by the output circuit 60. As a result, as represented in FIG. 6(b), such an output signal having "0" (LOW), or having "1" (HIGH) is obtained from the output terminal 65 of the output circuit 60. These signals have a steep rising edge and a steep falling edge.

In the above-described conventional rotation angle detecting device, since the operational amplifier 77 is used in the initiating circuit 70, there is a problem in that the circuit scale of this rotation angle detecting device is increased, while the initiating circuit 70 sets the signal level of the comparing circuit 50 to a preselected level when the power supply is turned ON.

SUMMARY OF THE INVENTION

The present invention has been made to solve the above-explained problem, and therefore, has an object to provide such a rotation angle detecting device capable of instantaneously stabilizing a signal having a desired level and outputting the stable signal when the power supply is turned ON, and also capable of reducing a circuit scale thereof.

To achieve the above-explained object, a rotation angle detecting device according to the present invention is featured by such a rotation angle detecting device comprising: a bridge circuit in which while a magnetic field applied to a magnetic detecting element is changed by rotating a magnetic rotation member mounted on a predetermined rotation shaft, the magnetic field change is converted into a voltage change; a first differential amplifying circuit for amplifying the signal outputted from the bridge circuit; an AC (alternating current) coupling circuit for removing a DC component from the output signal of the first differential amplifying circuit; a second differential amplifying circuit for amplifying the signal output from the AC coupling circuit; a comparing circuit for comparing the signal outputted from the second differential amplifying circuit with a predetermined reference value to thereby output any one of a signal of "0" and a signal of "1"; an output circuit for waveform-shaping the signal having "0", or "1" outputted from the comparing circuit; and an initiating circuit including a first transistor, a second transistor, a third transistor, and a differentiating circuit for driving the first to third transistors; in which both the first transistor and the second transistor are connected to the AC coupling circuit so as to converge the output signal of the AC coupling circuit into a reference voltage immediately after a power supply is turned ON; and in which the third transistor is connected to the comparing circuit so as to also converge the input signal of the comparing circuit into an AC coupling reference level.

Also, the rotation angle detecting device according to the present invention is featured by that both a collector of the first transistor and an emitter of the second transistor are connected to an output terminal of the AC coupling circuit; both an emitter of the first transistor and a collector of the second transistor are connected to a reference voltage unit of the AC coupling circuit; a collector of the third transistor is connected to the output terminal of the comparing circuit; and the differentiating circuit is constituted by a resistor and a capacitor, and is connected to the bases of the first, second, and third transistors so as to drive the first, second, and third transistors only for a give period of time which is determined based upon both the resistance value of the resistor and the capacitance value of the capacitor.

BRIEF DESCRIPTION OF THE DRAWINGS

For a better understand of the present invention, reference is made of a detailed description to be read in conjunction with the accompanying drawings, in which:

FIG. 4(a) to FIG. 4(c) are diagrams for illustratively indicating the structure of the magnet circuit employed in the conventional rotation angle detecting device, and also for illustratively showing a structure of a magnet circuit employed in the rotation angle detecting device according to the embodiment 1 of the present invention;

FIG. 6(a) and FIG. 6(b) are the timing chart for explaining the operations of the signal processing circuit employed in the conventional rotation angle detecting device.

DETAILED DESCRIPTION OF THE PREFERRED EMBODIMENTS

Referring now to drawings, various preferred embodiments of the present invention will be described.

Figure 1:
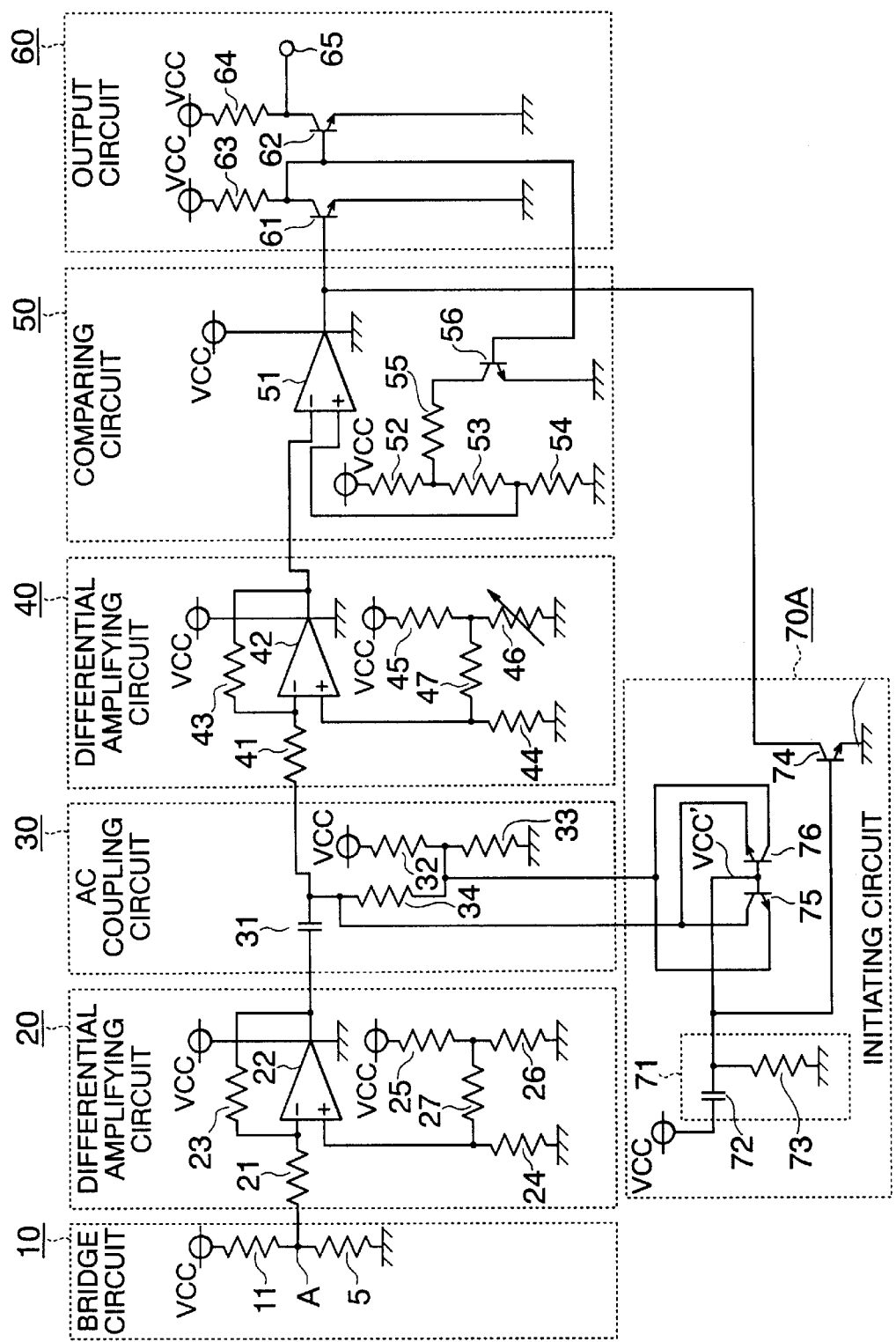
FIG. 1 is a circuit diagram of a signal processing circuit of a rotation angle detecting device according to a embodiment 1 of the present invention.
Figure 5:
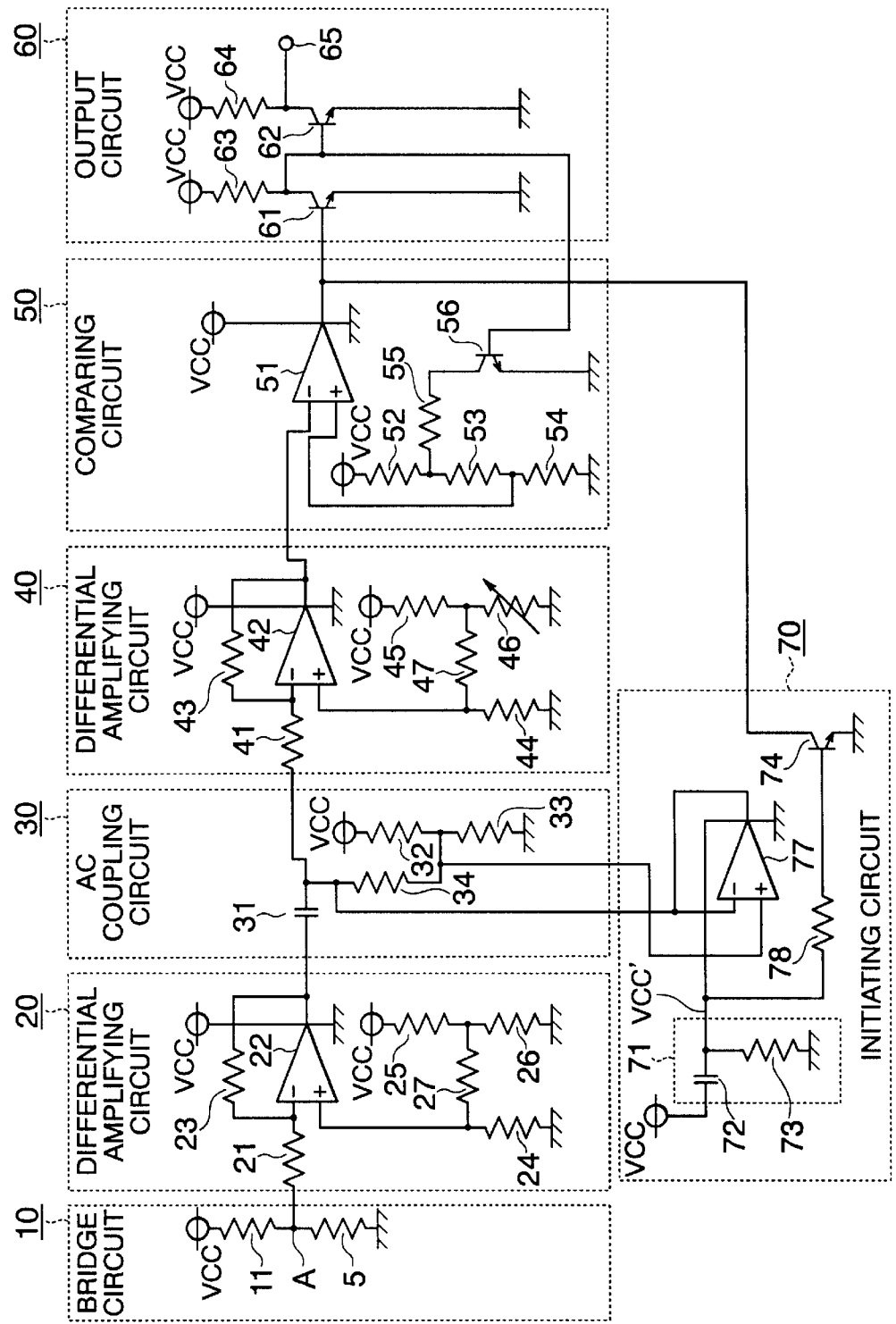
FIG. 5 is the circuit diagram of the signal processing circuit employed in the conventional rotation angle detecting device.

FIG. 1 is a circuit diagram of a signal processing circuit employed in a rotation angle detecting device according to an embodiment 1 of the present invention. It should be noted that the same reference numerals shown in FIG. 5 will be employed as those for denoting the same, or similar circuit elements indicated in FIG. 1.

In FIG. 1, an initiating circuit 70A is provided with a differentiating circuit 71, a transistor 74, and further transistors 75 and 76. This differentiating circuit 71 is constructed of a capacitor 72 and a resistor 73. It should be understood that other circuit arrangements of this signal processing circuit are identical to those of the conventional signal processing circuit indicated in FIG. 5.

In this embodiment 1, since the initiating circuit 70A is employed, it is possible to obtain a stable output signal just after the power supply is turned ON. This initiating circuit 70A contains the transistors 74, 75, and 76, and also the differentiating circuit 71 which is constituted by the resistor 73 and the capacitor 72 and is employed so as to drive these transistors 74 to 76.

Figure 3:
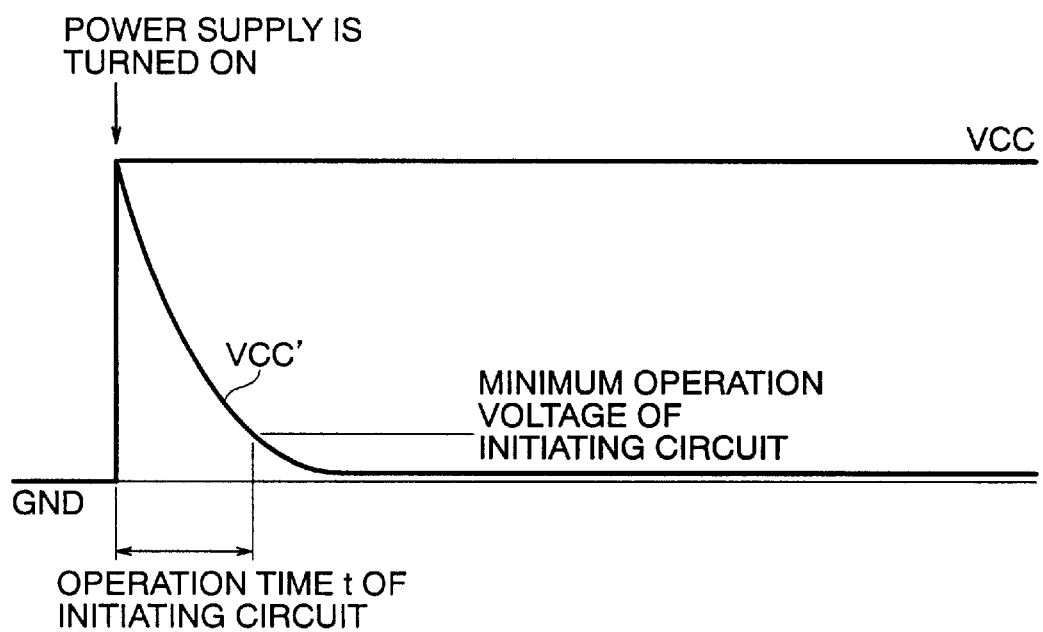
FIG. 3 is a timing chart for explaining operations of an initiating circuit employed in the signal processing circuit of the rotation angle detecting device according to the embodiment 1 of the present invention.

As shown in FIG. 3, the transistors 74, 75, and 76 are set under such a condition that these transistors may be operated only for a constant time "t" which is determined based upon the resistance value of the resistor 73 and the capacitance value of the capacitor 72. As indicated in FIG. 1, the base of the transistor 74 is connected to the differentiating circuit 71, the collector of this transistor 74 is connected to an output terminal of an operational amplifier 51 employed in the comparing circuit 50, and the emitter of the transistor 74 is connected to the ground. The base of the transistor 75 is connected to the base of the transistor 76, and also, both the bases of these transistors 75 and 76 are connected to the differentiating circuit 71. Both the collector of the transistor 75 and the emitter of the transistor 76 are connected to the output terminal of the AC coupling circuit 30, whereas both the emitter of the transistor 75 and the collector of the transistor 76 are connected to a reference voltage (for instance, ½×VCC) unit of the AC coupling circuit 30.

As a consequence, even when a very large difference is produced in the resistance value of the resistor 11 and also the resistance value of the MR element 5, which constitute the bridge circuit 10, the output signal of the AC coupling circuit 30 is converged to the reference voltage immediately after the power supply is turned on, and also, the input signal of the comparing circuit 50 is converged into an AC coupling reference level. As a consequence, the initiating characteristic can be improved. Also, the circuit scale of this initiating circuit 70A can be reduced, as compared with the conventional initiating circuit 70 with employment of the operational amplifier 77.

Figure 2:
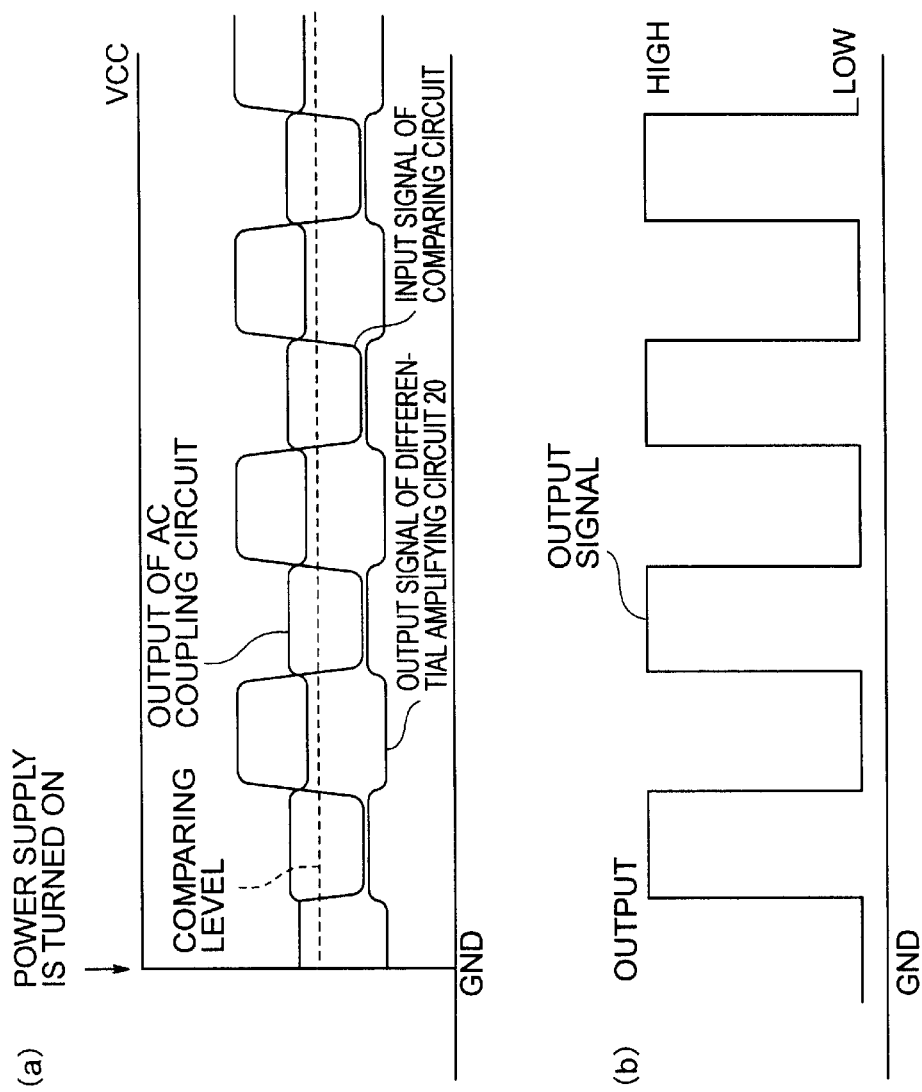
FIG. 2(a) and FIG. 2(b) are timing charts for representing operations of the signal processing circuit employed in the rotation angle detecting device of the embodiment 1 of the present invention.

FIG. 2 is a timing chart for indicating a waveform processing operation obtained while the magnetic rotation member 2 is rotated in the above-explained rotation angle detecting device according to this embodiment 1.

Since the magnetic rotation member 2 is rotated, a magnetic field change is applied to the MR element 5, so that such an output as shown in FIG. 2(a) is obtained from the output side of the differential amplifying circuit 20. This output signal corresponds to the concave/convex portions of the magnetic rotation member 2.

The output signal of this differential amplifying circuit 20 is supplied to the AC coupling circuit 30, and then, a DC component is removed from this supplied signal by this AC coupling circuit 30. At the same time, a reference voltage (for example, (½)×VCC) is applied as a DC component. Then, the output signal of this AC coupling circuit 30 is furthermore amplified by the differential amplifying circuit 40, and then, the amplified signal is supplied to the comparing circuit 50.

As indicated in FIG. 2(a), the signal (input signal of comparing circuit) which is supplied to the comparing circuit 50 is compared with a reference value equal to a comparison level so as to be converted into either a signal of "0" or a signal of "1."

This comparison signal is furthermore waveform-shaped by the output circuit 60. As a result, as represented in FIG. 2(b), such an output signal having "0" (LOW), or having "1" (HIGH) is obtained from the output terminal 65 of the output circuit 60. These signals have a steep rising edge and a steep falling edge.

Conventionally, the operational amplifier 77 is employed in the initiating circuit 70 which may set the signal level of the comparing circuit 50 to a predetermined level. In contrast thereto, in this embodiment 1, since the transistors 75 and 76 are employed in the initiating circuit 70, the circuit scale can be reduced and accordingly, the manufacturing cost thereof can be lowered.

What is claimed is:

1. A rotation angle detecting device comprising:
    a bridge circuit in which while a magnetic field applied to a magnetic detecting element is changed by rotating a magnetic rotation member mounted on a predetermined rotation shaft, said magnetic field change is converted into a voltage change;
    a first differential amplifying circuit for amplifying the signal outputted from said bridge circuit;
    an AC (alternating current) coupling circuit for removing a DC component from the output signal of said first differential amplifying circuit;
    a second differential amplifying circuit for amplifying the signal output from the AC coupling circuit;
    a comparing circuit for comparing the signal outputted from said second differential amplifying circuit with a predetermined reference value to thereby output any one of a signal of "0" and a signal of "1";

an output circuit for waveform-shaping said signal having "0", or "1" outputted from said comparing circuit; and an initiating circuit including a first transistor, a second transistor, a third transistor, and a differentiating circuit for driving said first to third transistors; in which both said first transistor and said second transistor are connected to said AC coupling circuit so as to converge the output signal of said AC coupling circuit into a reference voltage immediately after a power supply is turned ON; and in which said third transistor is connected to said comparing circuit so as to also converge the input signal of said comparing circuit into an AC coupling reference level.

2. A rotation angle detecting device as claimed in claim 1 wherein:

both a collector of said first transistor and an emitter of said second transistor are connected to an output terminal of said AC coupling circuit;

both an emitter of said first transistor and a collector of said second transistor are connected to a reference voltage unit of said AC coupling circuit;

a collector of said transistor is connected to the output terminal of said comparing circuit; and said differentiating circuit is constituted by a resistor and a capacitor, and is connected to the bases of said first, second, and third transistors so as to drive said first, second, and third transistors only for a give period of time duration which is determined based upon both the resistance value of said resistor and the capacitance value of said capacitor.

* * * * *